United States Patent [19]

Akiyama

[11] Patent Number: 4,494,154
[45] Date of Patent: Jan. 15, 1985

[54] PICKUP CONTROL DEVICE AND METHOD FOR FAST OR SLOW REPRODUCTION IN A DISK READING SYSTEM

[75] Inventor: Toru Akiyama, Saitama, Japan

[73] Assignee: Universal Pioneer Corporation, Tokyo, Japan

[21] Appl. No.: 286,221

[22] Filed: Jul. 23, 1981

[30] Foreign Application Priority Data

Aug. 4, 1980 [JP] Japan .............. 55-110414[U]

[51] Int. Cl.³ .............. G11B 7/00; G11B 21/08; G11B 21/10; H04N 5/76
[52] U.S. Cl. .............. 358/342; 369/32; 369/33; 369/44; 369/46
[58] Field of Search .............. 358/342, 312; 369/43-46, 109-111, 32, 33, 41

[56] References Cited

U.S. PATENT DOCUMENTS

| | | | |
|---|---|---|---|
| Re. 29,963 | 4/1979 | Janssen | 369/46 |
| 3,911,211 | 10/1975 | Rennick | 358/342 |
| 3,976,828 | 8/1976 | Janssen | 369/46 |
| 4,037,252 | 7/1977 | Janssen | 369/46 |
| 4,057,832 | 11/1977 | Kappert | 369/46 |
| 4,236,232 | 11/1980 | Jansen et al. | 369/44 |
| 4,330,880 | 5/1982 | Van Disk | 369/32 |
| 4,359,635 | 11/1982 | Gross | 250/201 |
| 4,397,009 | 8/1983 | Eriksson | 369/32 |

OTHER PUBLICATIONS

Jongen et al., Optical Disc Drive, Int. Conf. on Video and Data Recording, Southhampton, Eng., 24-27 Jul. 1979, 8 pp.

*Primary Examiner*—Raymond F. Cardillo, Jr.
*Attorney, Agent, or Firm*—Sughrue, Mion, Zinn, Macpeak and Seas

[57] ABSTRACT

A pickup control device for a data reading device in which, for fast or slow reproduction modes, a slider motor is forcibly driven to change the relative position of the pickup and the disk in a radial direction of the disk after which the pickup is set to a normal or center position thereof. A slider motor for changing the relative position of the pickup and the disk is driven in response to a fast or slow reproduction instruction and a position signal representative of the position of the pickup is produced with which a tracking servo loop is opened for a predetermined period of time during which the pickup is returned to its normal position. With this construction, the pickup is prevented from returning to a first track from a second track to which it has jumped through a scratch or the like.

2 Claims, 8 Drawing Figures

PICKUP CONTROL DEVICE AND METHOD FOR FAST OR SLOW REPRODUCTION IN A DISK READING SYSTEM

BACKGROUND OF THE INVENTION

The present invention relates to pickup control devices for data reading devices. More particularly, the invention relates to a pickup control device which is suitable for either fast or slow reproduction in an optical data reading device.

In a video disk data reading system, an optical pickup is employed which applies a laser beam onto the recording surface of a disk. The laser beam reflected from or passed through the disk is demodulated in accordance with information recorded thereon. A tracking servo device is provided for a disk data reading device in such a data reading system so that the angle of rotation of the tracking mirror for deflecting the light beam is suitably controlled to cause the light beam to accurately follow the tracks on the disk at all times.

In the case where the data reading device is operated in a fast or slow reproduction mode, it is necessary for the irradiating light beam to jump recording tracks every predetermined period, for instance, every field in the case of triple speed and every two frames in the case of half speed. In a control method employed for this purpose, a jump signal is externally applied to the tracking mirror to forcibly turn the latter, and the angle of rotation of the tracking mirror is detected so that, in accordance with the detected angle of rotation, a slider is driven to control the relative position of the pickup laser beam and the disk in a radial direction. Specifically, the fact that the dc component of the mirror drive signal corresponds to the angle of rotation of the mirror is utilized to drive a slider motor.

However, if a first track being followed by the pickup is coupled through a scratch or the like to a second track to which the pickup should jump, even if the pickup jumps to the second track in response to the jump signal, it may return to the first track and, in association with this movement, the slider, motor is also returned to the former state. Thus, the pickup cannot leave the first track and hence fast or slow reproduction cannot be carried out. This phenomenon is attributed to the tracking servo control in which the slider motor is driven according to the dc signal corresponding to the angle of rotation of the tracking mirror.

SUMMARY OF THE INVENTION

Overcoming these drawbacks, the invention provides a pickup control device for a data reading device in which, for fast or slow reproduction, the slider motor is forcibly driven to change the relative position of the pickup and the disk in a radial direction, and thereafter the pickup is set to a regular position.

A specific feature of the pickup control device of the invention is that first a relative position changing means such as a slider motor for changing the relative position of the pickup and the disk is driven in response to a fast or slow reproduction instruction, a position signal representative of the position of the pickup moved by driving the changing means is then produced to maintain the tracking servo loop open for a predetermined period of time, and during this period the pickup is jumped to the next predetermined track.

DESCRIPTION OF THE PREFERRED EMBODIMENTS

The invention will be described with reference to the accompanying drawings.

Figure 2A:
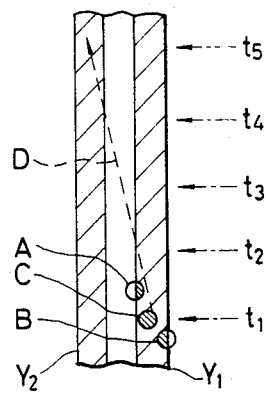
FIG. 2A is an explanatory diagram indicating positional relationships between a pickup laser beam spot and tracks.
Figure 2B:
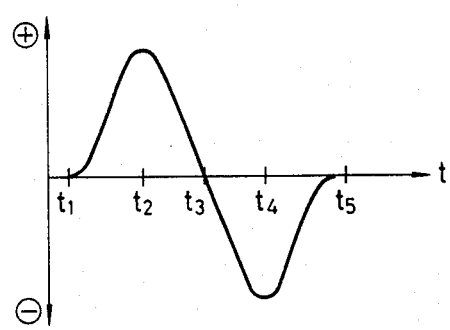
FIG. 2B is a diagram showing the waveform of a tracking error signal which is generated when a jumping operation is effected.

FIG. 2A shows the positional relationships between adjacent video tracks $Y_1$ and $Y_2$ and irradiating light beams or light "spots" which perform the pickup function for the data reading device. Spots A and B are used to produce error signals for a tracking servo and a spot C is used for signal reproduction. FIG. 2B is a graphical representation indicating the difference $(A-B)$ in optical density between the spots A and B as a function of time t when the spots A, B and C jump from the first track $Y_1$ to the second track $Y_2$ along the dotted line D.

The reflected light quantities corresponding to the spots A and B are received by light receiving elements and the difference between the outputs of the light receiving elements is obtained, so that a signal output having a waveform similar to the waveform shown in FIG. 2B is provided. This signal $(A-B)$ is an error signal corresponding to the direction in which the irradiation light beams are spaced from the track center line and to the distance therebetween.

Figure 1:
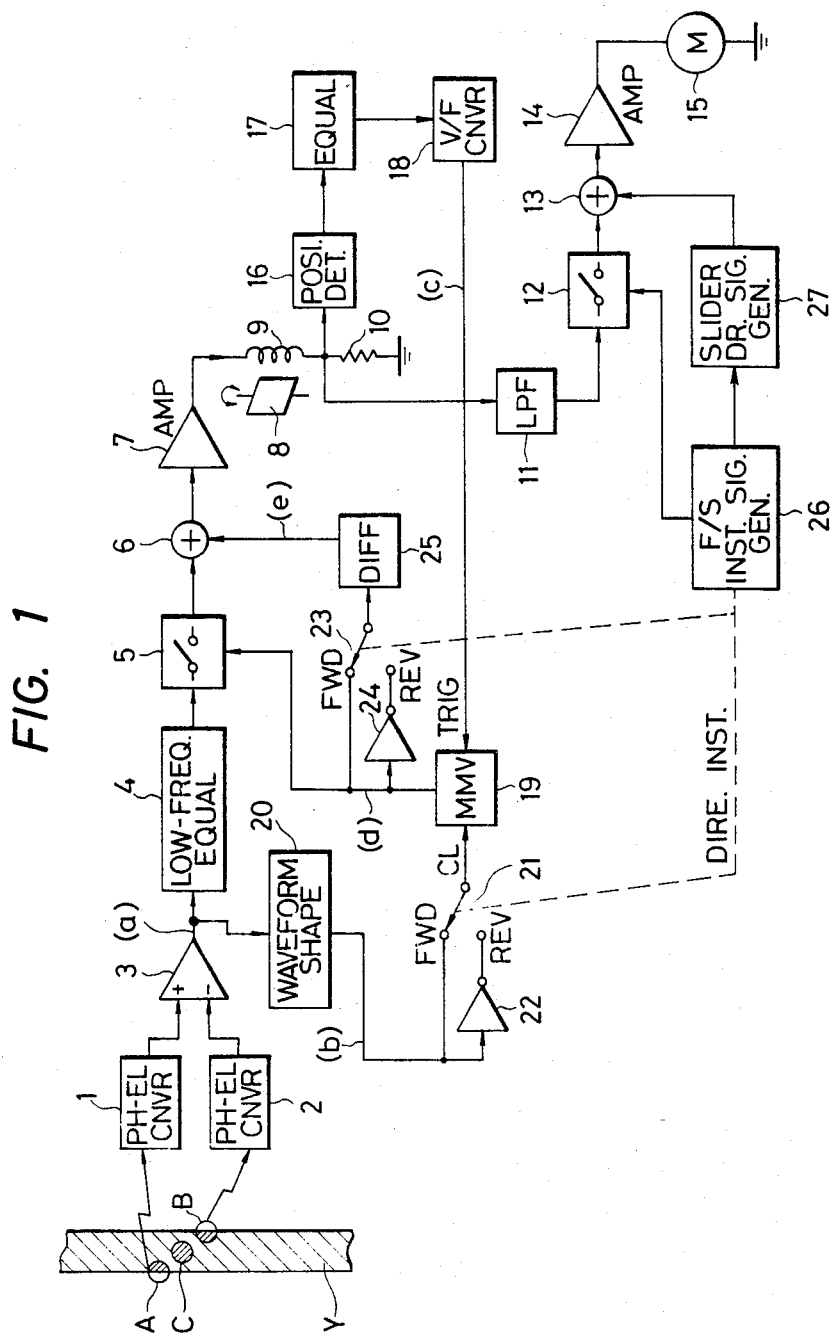
FIG. 1 is a block diagram showing a preferred embodiment of a data reading device of the invention.

FIG. 1 is a block diagram showing a preferred embodiment of a data reading device of the invention using optical spots as shown in FIGS. 2A and 2B.

As shown in FIG. 1, photoelectric conversion elements 1 and 2 are provided which receive light from the spots A and B, respectively. The outputs of these elements 1 and 2 are applied to a differential amplifier 3 which outputs a signal $(A-B)$ whose waveform is equivalent to that shown in FIG. 2B. The signal $(A-B)$, i.e. an error signal a, is applied to a low frequency equalizer 4 adapted to emphasize low frequency components and to compensate for phase lag. The output of the equalizer 4 is applied to an amplifier 7 through a loop switch adapted to open and close a tracking servo loop and through analog signal summer 6. The amplifier 7 produces a signal for driving a coil 9 which is used to turn a tracking mirror 8.

A resistor 10 is connected to the driving coil 9 to detect current flowing in the driving coil 9, thereby to provide a voltage corresponding to the detected current. The voltage thus provided is converted into a dc voltage by a LPF (low-pass filter) 11. The output of the LPF 11 is applied through a switch 12 and an analog signal summer 13 to an amplifier 14. The output of the amplifier 14 drives a slider motor 15 which moves a pickup laser beam relative to the disk in a radial direction.

A position detector 16 is coupled to the resistor 10 to detect the absolute value of the voltage across the resistor 10, thereby to produce a position detection signal. The position detection signal is applied to a V/F (voltage-to-frequency) converter 18 after it has been applied to an equalizer 17 where it is subjected to phase compensation. Thus, the V/F converter 18 outputs a pulse signal C having a frequency corresponding to the rotation angle of the tracking mirror 8. The pulse signal C is applied to the trigger input of a monostable multivibrator 19 which determines the mirror driving timing for fast or slow reproduction.

The output signal a of the differential amplifier 3 is shaped into a substantially square pulse signal b by a waveform shaping circuit 20. The pulse signal b is applied directly to a terminal FWD of a forward/reverse direction change-over switch 21 and further applied through an inverter 22 to a terminal REV of the change-over switch 21. The selected output of the switch 21 is applied as a clear signal to the monostable multivibrator 19. The output of the multivibrator 19 is employed as a control signal to open the tracking servo loop switch 5. Furthermore, the output of the multivibrator 19 is applied directly to a terminal FWD of a forward/reverse direction change-over switch 23 and applied through an inverter 24 to a terminal REV of the change-over switch 23. The selected output of the switch 23 is differentiated by a differentiator circuit 25. The differentiation output e is applied to the signal summer 6 to control the angle of rotation of the tracking mirror 8.

An instruction signal generator 26 is provided to control fast and slow reproduction and the directions thereof. More specifically, the generator 26 provides instructions to control the operations of the change-over switches 21 and 23 and to open the switch 12. A slider drive signal generator 27 produces a dc voltage having a polarity and a level corresponding to fast or slow reproduction speed. The dc voltage is applied through the signal summer 13 to the amplifier 14 to drive the slider motor 15.

During reproduction, the switches 5 and 12 are usually maintained closed and the tracking mirror 8 is turned so that the tracking error signal of the differential amplifier 3 is zero at all times, thus maintaining precise tracking. In this operation, as the position of the pickup deviates from the recorded track, the LPF 11 outputs a dc voltage in response to the amount of deviate to control the slider motor 15. As a result, the relative position of the pickup and the disk is moved in the radial direction one track at a time so that tracking is carried out with the laser spot aligned with the track center line at all times.

Figure 3A:
FIGS. 3A–3E are timing charts showing operating signals at various circuit positions in FIG. 1.
Figure 3B:
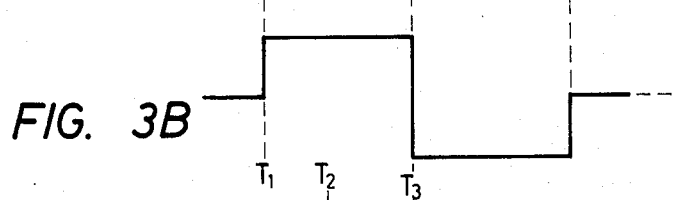
Figure 3C:
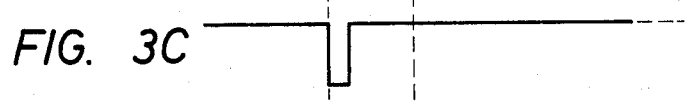

When the instruction signal generator 26 provides an instruction signal, for instance, for fast reproduction in the forward direction at the time instant $T_1$ (FIG. 3), the switch 12 is opened while the armatures on the switches 21 and 23 are connected to the terminals FWD respectively. At the same time, the slider drive signal generator 27 produces a dc voltage having a polarity and a level corresponding to the fast reproduction speed to forcibly drive the slider motor 15. For instance, in the case of triple speed reproduction, the slider motor is driven so that the pickup laser spot C tracks the disk every three tracks. In this case, the tracking servo loop switch 5 is maintained closed. Therefore, the angle of rotation of the tracking mirror 8 is increased to follow the present track, as a result of which the dc level of the tracking error signal a increases as shown in FIG. 3A. This dc voltage is applied through the position detector 16 and the equalizer 17 to the V/F converter 18 whereupn a pulse signal c having a frequency corresponding to the dc voltage level is produced at the time instant $T_2$ as shown in FIG. 3C. (FIG. 3C shows only one pulse c as FIG. 3 covers only a part of the time axis.)

Figure 3D:
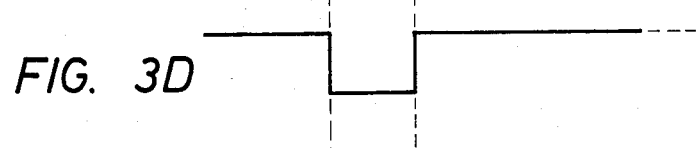
Figure 3E:

The monostable multivibrator 19 is triggered by the falling edge of the pulse c at time $T_2$, thereby producing in response thereto a single negative pulse d as shown in FIG. 3D. While the pulse d is active, the servo loop switch 5 is maintained open and the differentiation output e from the differentiator circuit 25 is employed to drive the mirror 8. The single pulse d is converted into a differentiation pulse as indicated in FIG. 3E. For the duration ($T_2$ to $T_3$) of the pulse, a force which is opposite in direction to that applied to the mirror and which decreases gradually is applied to the mirror. That is, a force acts on the mirror so that the mirror is returned to the center or regular position thereof. When the tracking error signal a becomes substantially zero, the output pulse signal b of the waveform shaping circuit 20 falls as shown in FIG. 3B. The monostable multivibrator 19 is cleared by the falling edge of the output b at time $T_3$ so that the single pulse d is terminated. In this operation, the differentiation output has a positive polarity, i.e. it provides a braking force the level of which decreases gradually. This braking force is applied to the mirror 8 so that the mirror 8 does not swing past the center of turning thereof. In this case, the servo loop switch 5 is closed again, and therefore servo operation is effected with the error signal a so that the laser spot follows the track center line. The above-described operation is repeatedly carried out whenever the V/F converter 18 outputs the pulse signal c. Therefore, the jumping operation is effected in conformance to the slider drive speed and the mirror is set at the center of turning at all times. That is, the tracking operation is accurately carried out for desired tracks. Thus, the problem that the jumping operation cannot be carried out, for instance, by the presence of scratches on the disk, will not arise. Even if the laser beam is unsatisfactorily focused, the jumping operation is positively carried out because the slider is forcibly driven.

The circuit shown in the block diagram of FIG. 3 is given only as an example. It goes without saying that the circuit can be modified in various manners without departing from the spirit of the invention.

What is claimed is:

1. A pickup control for a data reading device comprising:
   pickup means including a source of a first laser beam for reading data stored on a disk-shaped recording medium, a source of at least one second laser beam for detecting departure of said first laser beam from a center line of a track recorded on said disk-shaped recording medium, a slider means for moving radially between a circumferential edge and center of said disk-shaped recording medium said first and second laser beams, and a tracking mirror rotatably secured to said slider means for reflecting said first and second laser beams to a surface of said disk-shaped recording medium;
   tracking servo means including a light sensor means which responds to a reflection of said second laser beam from said disk-shaped recording medium by outputting a tracking error signal corresponding to a direction and distance of departure of said first laser beam from said center line;
   tracking mirror drive means for rotating said tracking mirror in response to said tracking error signal to cause said first laser beam to accurately track said center line;

slider drive means for moving radially said pickup means by said slider means in response to said tracking error signal to cause said first laser beam to accurately track said center line;

first switch means for disconnecting said tracking mirror drive means and said slider drive means from receiving said tracking error signal;

means for converting said tracking error signal into a position detecting signal which upon reaching a predetermined value triggers said first switch means to disconnect said tracking mirror drive means and said slider drive means from receiving said tracking error signal;

means for converting said position detecting signal into a first component of a differentiation output signal which when applied to said tracking mirror drive means for a predetermined time causes said tracking mirror to rotate toward a regular position at the middle of the arc along which said tracking mirror rotates in an opposite direction to which said tracking mirror is initially rotated in response to said tracking error signal;

means for providing said differential output signal to said tracking mirror drive means at the same time that said first switch means is triggered to prevent transmission of said tracking error signal to said tracking mirror drive means;

means for triggering said first switch means to restore transmission of said tracking error signal to said tracking mirror drive means following triggering to prevent said transmission when said first laser beam is accurately tracking said center line;

means for producing a braking second component of said differentiation output signal to said tracking mirror drive means to force said tracking mirror to cease rotating toward said regular position following said application of said first component when said first laser beam is accurately tracking said center line;

means for providing one of fast and slow reproduction signals to said slider drive means to appropriately change the relative position of said pickup means to said disk-shaped recording medium causing said first laser beam to depart from said center line; and second switch means for disconnecting said slider means from receiving said tracking error signal when said one of fast and slow reproduction signals is provided to said slider drive means without interrupting transmission of said tracking error signals to said tracking mirror drive means and for reconnecting said slider drive means upon cessation of said one of fast and slow reproduction signals.

2. A method of controlling a pickup for a data reading device comprising:

detecting a direction and distance of departure of a reading laser beam from a center line of a track recorded on a disk-shaped recording medium;

outputting to a tracking mirror drive means a tracking error signal corresponding to said direction and distance of departure;

driving a tracking mirror to rotate in response to said tracking error signal such that said reading laser beam accurately tracks said center line;

outputting said tracking error signal to a slider drive means to drive a slider means to change the relative position of said pickup to said disk-shaped recording medium such that said reading laser-beam accurately tracks said center line;

converting said tracking error signal into a position detecting signal representative of a position of said pickup means when said relative position is changed by said slider means;

outputting said position detecting signal to a first switch means and a differentiator means when said position detecting signal exceeds a predetermined value;

triggering said first switch means to prevent transmission of said tracking error signal to said tracking mirror drive means and said slider drive means when said position detecting signal is output;

providing a first component of a differentiation output signal to said tracking mirror drive means when said position detecting signal is output;

driving for a predetermined time said tracking mirror to rotate toward a regular position at the middle of the arc along which said tracking mirror rotates in the opposite direction to which said tracking mirror is initially rotated in response to said tracking error signal in response to said first component of said differentiation output signal;

triggering said first switch means to restore transmission of said tracking error signal to said tracking mirror drive means and said slider drive means following triggering to prevent said transmission when said reading laser beam is accurately tracking said center line;

providing a braking second component of said differentiation output signal to said tracking mirror drive means following driving of said tracking mirror to rotate in response to said first component when said reading beam is accurately tracking said center line;

driving said tracking mirror to cease turning toward said regular position in response to said braking second component of said differentiation output signal;

providing one of fast and slow reproduction signals to said slider drive means to appropriately change the relative position of said pickup means to said disk-shaped recording medium;

driving said slider drive means in response to one of fast and slow reproduction such that said reading laser beam is caused to depart from said center line;

triggering a second switch means to disconnect said slider drive means from receiving said tracking error signal when one of fast and slow reproduction signals is provided to said slider drive means without interrupting transmission of said tracking error signal to said tracking mirror drive means; and triggering said second switch means to reconnect said slider drive means when provision of said one of fast and slow and reproduction signals ceases.

* * * * *